June 8, 1965 C. A. SCHURR ETAL Re. 25,795

ROLLING MILL CONTROL

Original Filed Oct. 16, 1958 13 Sheets-Sheet 1

INVENTOR.
Charles Allen Schurr
BY Frank Alan Manners
John H. Lemmerhirt
Their attorney.

INVENTOR.
Charles Allen Schurr
Frank Alan Manness
BY John H. Lemmond,
Their Attorney INVENTOR.
Charles Allen Schurr
Frank Allen Monroe
BY John H. Bromund
Their Attorney.

| | INSERT CARD | DATA TRANSLATOR AND MASTER CONTROL | PYROMETER READS | WORKPIECE REACHES PD3 | HOR. SCREWDOWN REACHES PREDETERMINED DIST. FROM BALANCE | WORKPIECE ENTERS HOR. ROLLS | TAIL END PASSES PD1 | WORKPIECE LEAVES ROLLS | HOR. SCREWDOWN REACHES PREDETERMINED DIST. FROM BALANCE |
|---|---|---|---|---|---|---|---|---|---|
| HOR. & VERT. SCREWDOWN | OFF | | OPERATE TO FIRST POSITION | | | OFF | | | OPERATE TO 2ND POS. |
| HOR. ROLL DRIVE | OFF | | | | ENTRY SPEED FWD. | ROLLING SPEED FWD. | | EXIT SPEED FWD. | OFF |
| VERT. ROLL DRIVE | OFF | | | | ENTRY SPEED | ROLLING SPEED | | EXIT SPEED | OFF |
| ENTRY TABLE | OFF | | APPROACH SPEED FWD. | OFF | ENTRY SPEED FWD. | ROLLING SPEED FWD. | OFF | | |
| DELIVERY TABLE | OFF | | | | | ROLLING SPEED FWD. | EXIT SPEED FWD. | | |
| APPROACH TABLE | OFF | APPROACH SPEED | | OFF | | | | | |
| SIDE GUIDES | OFF | | OPERATE TO ODD PASS POS. | | OFF | | | | OPERATE TO EVEN PASS POS. |
| PASS | #1 | | | | | | | | #2 |

Fig. 6

INVENTOR.
Charles Allen Schurr
Frank Alan Manners
BY John A. Lawson,
Their Attorney

| WORKPIECE ENTERS HOR. ROLLS | LEAD END PASSES PD2 | WORKPIECE LEAVES ROLLS | HOR. SCREWS REACH PREDETERMINED DIST. FROM BALANCE | WORKPIECE ENTERS ROLLS | TAIL END PASSES PD1 | WORKPIECE LEAVES ROLLS |
|---|---|---|---|---|---|---|
| | OFF | | OPERATE TO 3RD PASS POSITION | | | ROLLS SEPARATE |
| ENTRY SPEED REV. | ROLLING SPEED REV. | EXIT SPEED REV. | OFF | ENTRY SPEED | ROLLING SPEED FWD. | DELIVERY SPEED | OFF |
| | | | | ENTRY SPEED | ROLLING SPEED | DELIVERY SPEED | OFF |
| | ROLLING SPEED REV. | EXIT SPEED REV. | | ENTRY SPEED | ROLLING SPEED FWD. | DELIVERY SPEED | OFF |
| ENTRY SPEED REV. | ROLLING SPEED REV. | OFF | | | ROLLING SPEED FWD. | DELIVERY SPEED | |
| | | | | | | | |
| | OFF | OPERATE TO ODD PASS POS. | | | | | OPERATE TO FULL OUT |
| | | #3 | | | | | |

Fig. 6A

INVENTOR.
Charles Allen Schurr
Frank Alan Mennne
BY John A. Hamond,
Their Attorney.

INVENTOR.
Charles Allen Schurr
Frank Alan Manness
BY John A. Leonard,
their attorney.

INVENTOR.
Charles Allen Schurr
Frank Alan Manners
BY
John T. Leonard
their Attorney.

INVENTOR.
Charles Allen Schurr
Frank Alan Manners
BY John H. Leonard,
their attorney.

ROLLING MILL CONTROL

Original Filed Oct. 16, 1958 13 Sheets-Sheet 9

INVENTOR.
Charles Allen Schurr
Frank Alan Mennona
BY John H. Fraser,
their attorney.

INVENTOR.
Charles Arden Schurr
Frank Alan Monroe
BY John A. Romano,
Their Attorney.

INVENTOR.
Charles Allen Schurr
Frank Allen Manner
BY
John A. Lemon Jr.
their Attorney INVENTOR.
Charles Allan Schurr
Frank Alan Manners
BY John H. Leonard,
Their Attorney.

INVENTOR.
Charles Allen Schurr
Frank Alan Manners
BY John H. Lemmond,
their Attorney United States Patent Office Re. 25,795
Reissued June 8, 1965

25,795
ROLLING MILL CONTROL

Charles Allan Schurr, Warrensville Heights, and Frank Alan Manners, Cleveland, Ohio, by Square D Company, Detroit, Mich., a corporation of Michigan, assignee Original No. 3,104,566, dated Sept. 24, 1963, Ser. No. 767,712, Oct. 16, 1958. Application for reissue Oct. 14, 1964, Ser. No. 419,261
4 Claims. (Cl. 72—12)

Matter enclosed in heavy brackets [ ] appears in the original patent but forms no part of this reissue specification; matter printed in italics indicates the additions made by reissue.

The present invention relates to a control system for a rolling mill, and to the parts thereof, and more particularly to a control system which establishes a rolling pattern in accordance with the conditions of a workpiece to be rolled and then automatically causes the mill to perform a sequence of operations to reduce the workpiece from an original thickness and width to a final thickness and width in accordance with the established pattern.

In the past, various attempts have been made to provide controls for various parts of a rolling mill. For example, screwdown positional devices under the control of an operator at a remote position have been devised for spacing the rolls for each successive pass and in accordance with a desired draft as determined by the operator. Likewise, the operation of the entry and delivery tables, approach tables, side guides, horizontal and vertical rolls and other parts of the rolling mill have been remotely controlled by an operator so that the operator could cause the various parts of the rolling mill to run in a desired sequence of operation and at desired speeds during the rolling of a workpiece.

It is well recognized in the industry that only operators of extremely high skill and long experience have been able to operate a rolling mill at optimum efficiency while obtaining final products of high quality. This was because every workpiece which went through the rolling mill was slightly different from every other workpiece and only a highly skilled operator was able to judge the number of passes or times the worpiece [is] *was* to be passed between the rolls, the draft of each pass, and other workpiece conditions which go together to make up a rolling pattern for that workpiece. Once the workpiece reached the approach and entry table of a rolling mill, it took a skilled operator to mentally estimate the rolling pattern which he should use and then complete the rolling operation in accordance with that pattern and while the workpiece was in rollable condition. This was particularly true of hot roll operations wherein the workpiece was rolled while it was hot. In order to operate the mill properly, the operator had to first determine his rolling pattern. Every time there was a change in the dimensions, metallurgy, or temperature of the workpieces being rolled, the operator had to select or determine a new rolling pattern. Over a series of workpieces, it was often necessary for the operator to determine as many as several hundred new patterns, often one for each workpiece when there was no succeeding identical [worpieces] *workpiece* being rolled. It was very difficult even for a skilled operator, to mentally determine which of the several hundred patterns he should use for a workpiece which he saw for the first time when it reached the approach table. Very often, the operator misjudged the condition of the workpiece and had to change his rolling pattern after he had once started the rolling operation to prevent damaging the mill.

Furthermore, in the prior remote control systems, it was necessary for the operators to initiate and control the operation of all operable parts of the mill. This meant controlling the screwdowns of both vertical and horizontal rolls, controlling the direction and speed of rotation of all rolls, the direction and speed of rotation of the approach, entry and delivery tables, controlling the movement of the side guides, and any other operating parts of the mill. In addition to controlling each part, all parts had to be run in a co-operative synchronized manner with the operator carefully watching to see that he was not overloading the mill and was obtaining optimum efficiency and output of a final product of good quality. In most instances, it took the co-ordinated efforts of at least two operators working in timed relationship to control the mill.

In these prior attempts to control a mill, each new control added to the mill was devised to eliminate one particular function which the operator had to accomplish so that the operator could concentrate his attention on the remaining aspects of operation of the rolling mill.

In one instance, slippage of the vertical rolls on the workpiece was reduced by a control which fixed the speed of the vertical rolls to a definite proportion of the speed of the horizontal rolls. In another instance, the rolling pattern was worked out in advance and recorded in such manner that the record could later be used to control the screwdown and other operations of the rolling mill, thereby improving the overall efficiency of the mill, provided the workpiece to be rolled arrived at the mill with conditions the same as the recorded conditions. If the records and workpieces were mixed, or if the workpieces did not arrive at the mill with their conditions exactly as previously recorded, the operator, would have to recognize these facts and alter the recorded pattern sufficiently to compensate for the deviations in actual and recorded workpiece conditions. In other instances the mill was provided with controls which would reverse the entry and delivery tables after the workpiece passed through the rolls in one direction.

It is apparent that in all of these prior attempts of controlling a rolling mill, to increase its efficiency, to reduce the possible damaging of the mill through misjudgement by the operator, and to increase the quality of the final product, the overall control of a rolling mill in accordance with the conditions of a workpiece being rolled remained a problem. Also the determination of the rolling pattern, including the number of passes to be taken at the draft for each pass, [were] *was* often left entirely to the judgement of the operator at the time of rolling the workpiece.

One of the main objects of the present invention is to overcome the aforementioned deficiencies in, and problems encountered with, prior control systems for rolling mills.

Another object of the present invention is to provide a control system which will automatically operate a rolling mill throughout a complete cycle of operation to reduce a workpiece from an original thickness to a desired final thickness.

Another object of the present invention is to provide a control system for a rolling mill which will increase the efficiency and life of a rolling mill, reduce the maintenance thereof, and increase the quality of the final products of the mill.

Another object of the present invention is to provide a complete control system for a rolling mill, which includes determination of the number of passes a workpiece is to be sent through the mill, the draft for each pass, and the integration therewith of controls for vertical and horizontal rolls, entry and delivery tables, side guides and other operative parts of the mill.

Another object of the present invention is to provide a control system to establish a rolling pattern from the conditions of the workpiece to be rolled and to control the operation of a rolling mill in accordance with the pattern thus established.

Another object of the invention is to provide a control system for determination of the number of times a workpiece is to be passed through a rolling mill to reduce the workpiece from an original thickness to a final thickness, the number of passes being derived from the conditions of the workpiece at the starting of the rolling operation.

A further object of the invention is to provide a system for determination of the draft during each pass of a workpiece between the rolls of a rolling mill and for control of the screwdown in accordance with the draft determinations.

A further object of the invention is to provide a system for control of the relative speeds of the vertical rolls and the horizontal rolls during a particular pass in accordance with the draft during that pass.

A still further object of the invention is to provide a finished product formed by rolling a workpiece in a rolling mill controlled by a control system incorporating the features of the present invention as hereinafter claimed.

Other objects and a fuller understanding of the invention will become apparent from the claims and the following description of an embodiment of the invention taken in conjunction with the attached drawings in which:

Figure 1:
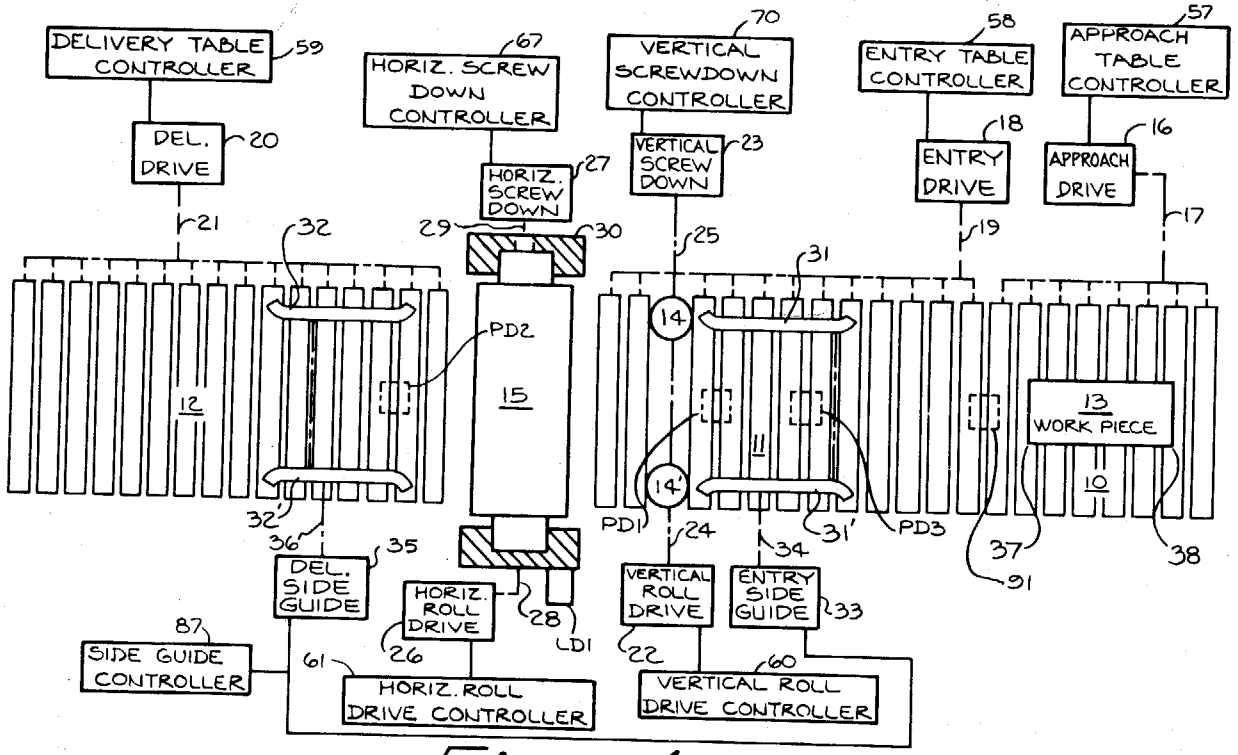
FIGURE 1 is a plan view of a rolling mill controlled by the present control system.
Figure 4:
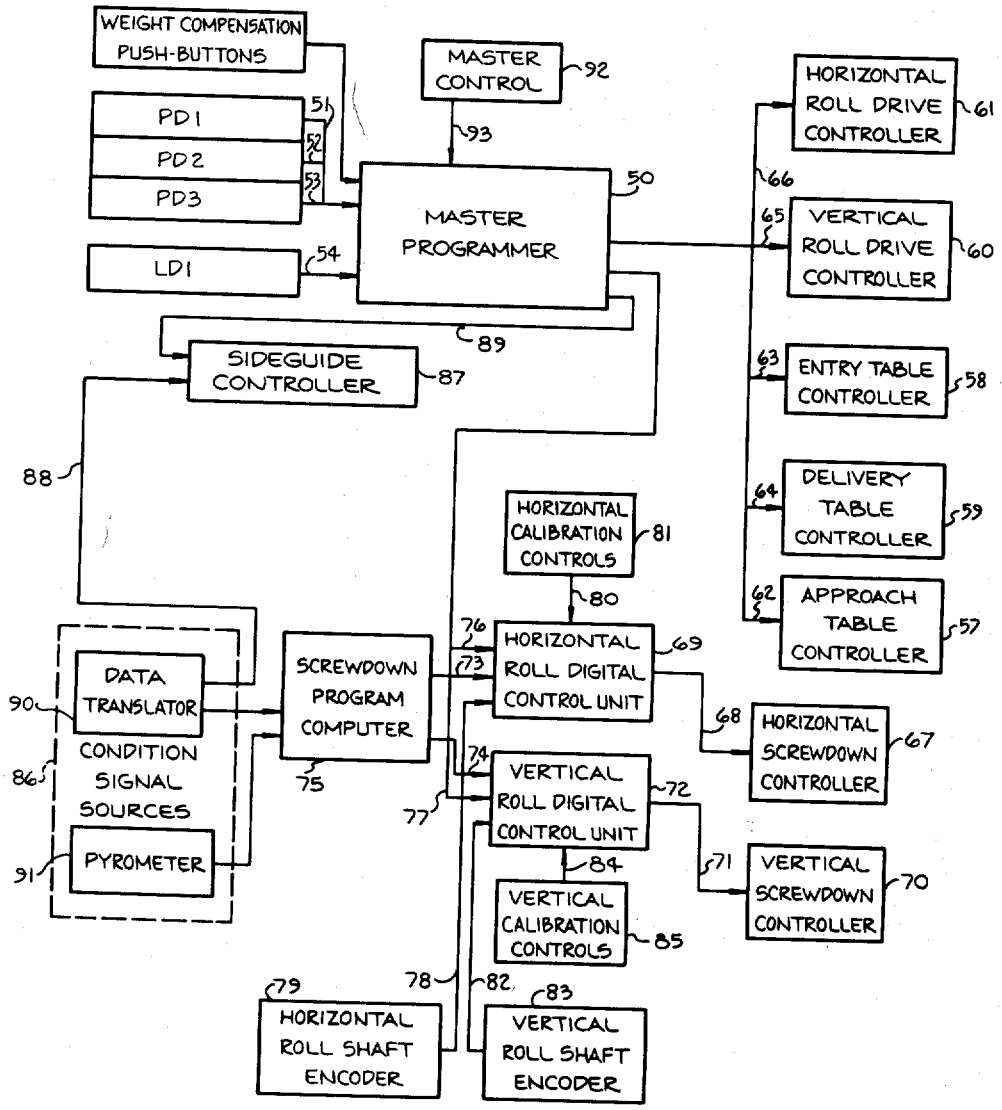
FIGURE 4 is a block diagram schematic of the control system for the rolling mill shown in FIGURE 1.
Figure 7:
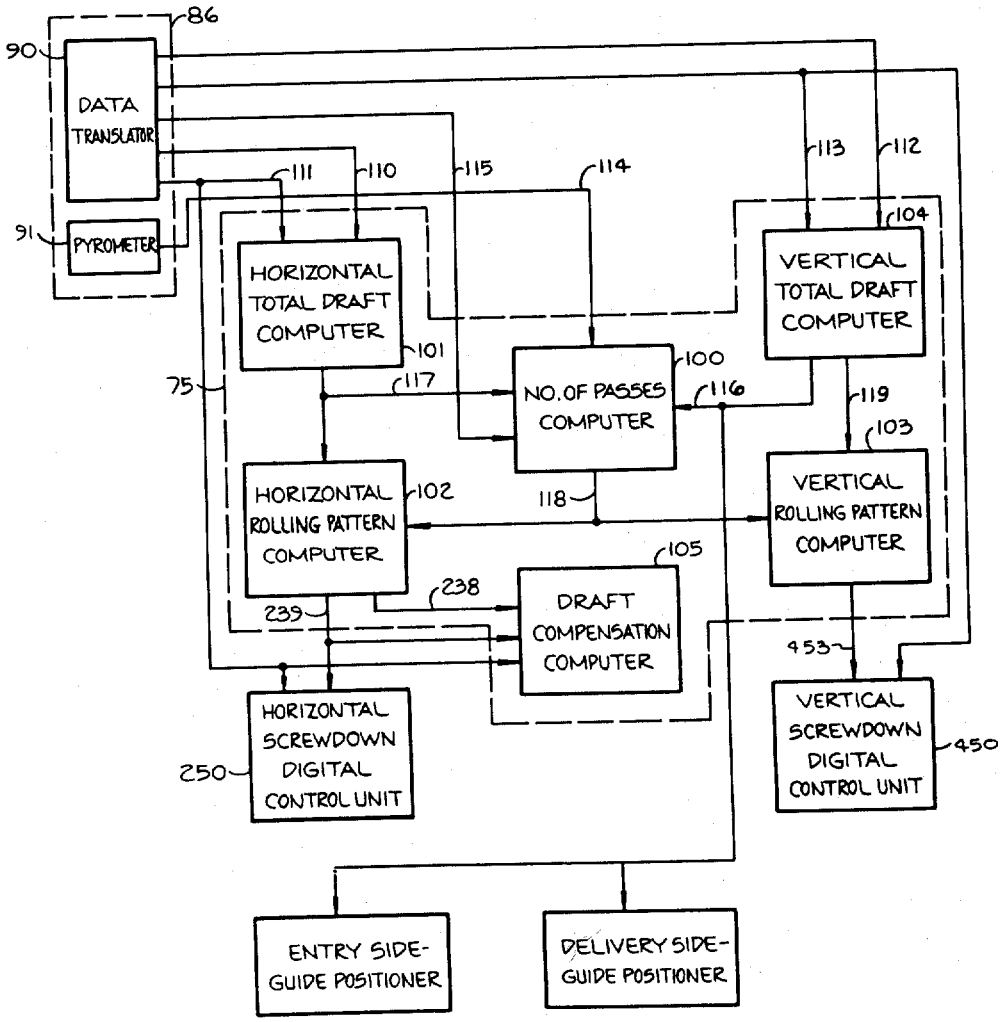
Figure 8:
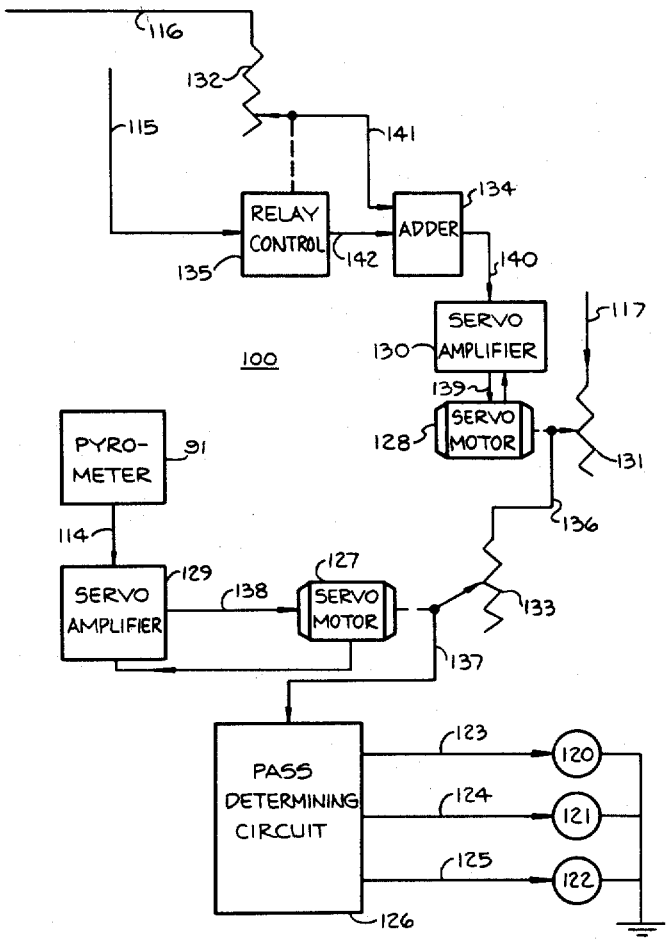
Figure 9:
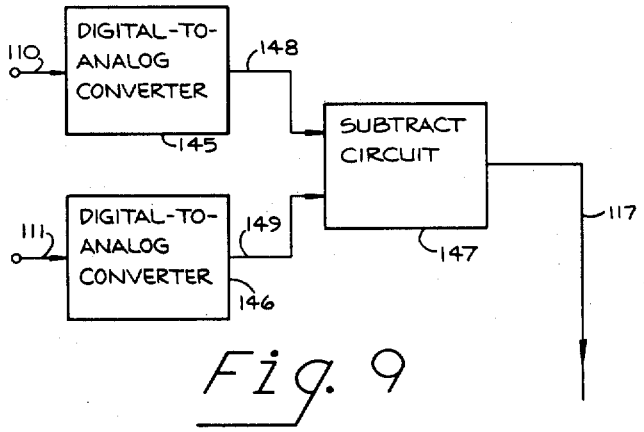
Figure 10:
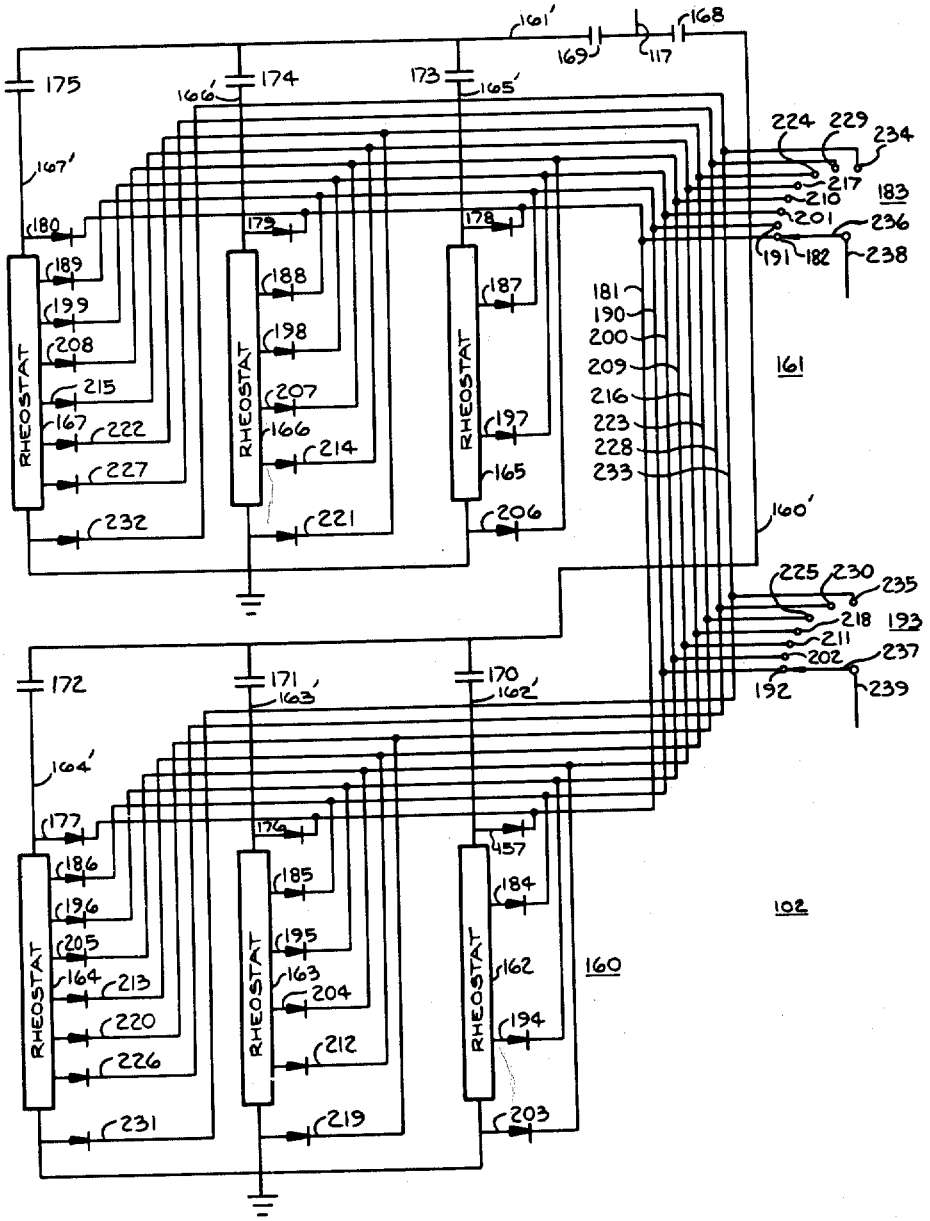
Figure 11:
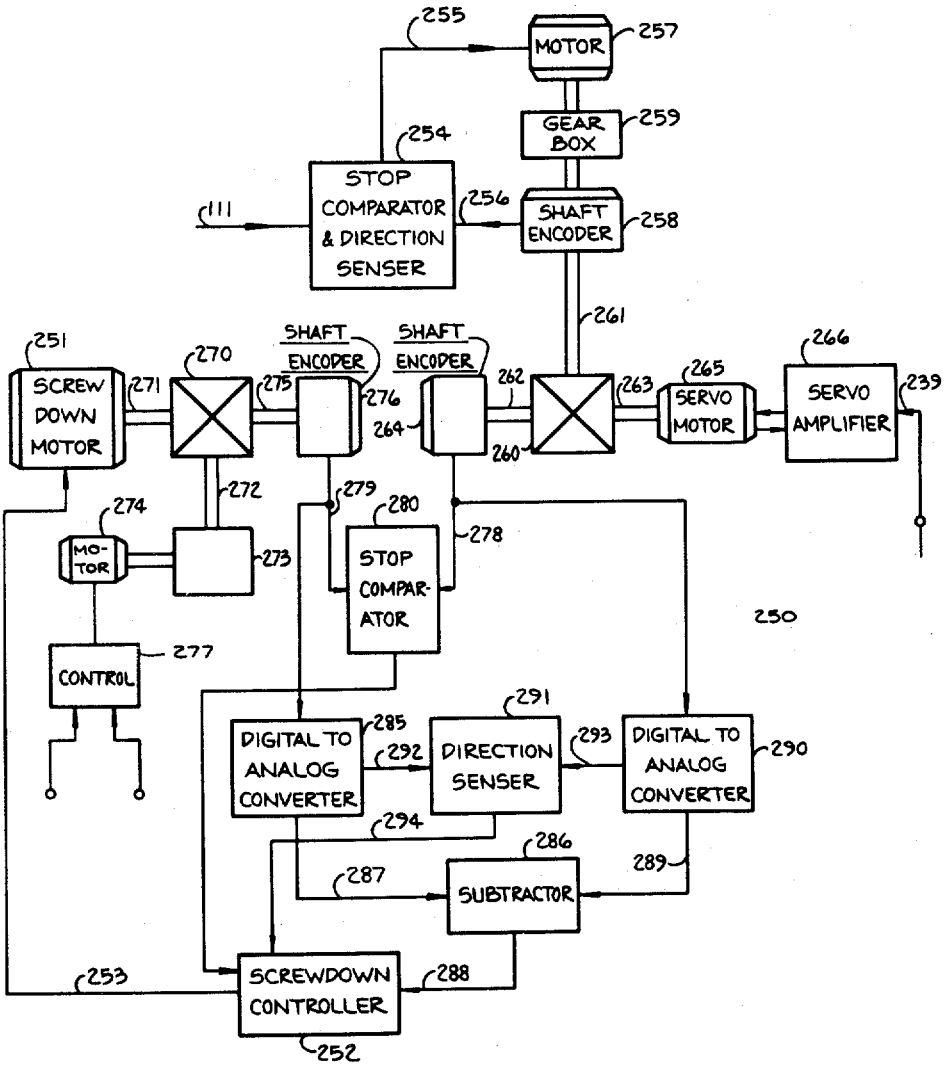

FIGURES 6 and 6A when combined [is] *form* a chart showing the sequence of operation of the rolling mill in FIGURE 1 and as controlled by the system of FIGURE 4 for three passes;

FIGURE 7 is a block diagram schematic illustrating certain computing and positioning units used in the control system of FIGURE 4;

FIGURE 8 is a block diagram schematic illustrating the ["number of passes computer"] *number of passes computer* part of the control system of FIGURE 4;

FIGURE 9 is a block diagram schematic illustrating the horizontal total draft computer part of the control system of FIGURE 4;

FIGURE 10 is a schematic wiring diagram illustrating the horizontal rolling pattern computer part of the control system of FIGURE 4;

FIGURE 11 is a block diagram schematic illustrating the horizontal screwdown position control unit part of the control system of FIGURE 4 which spaces the horizontal rolls for each pass.

Figure 13:
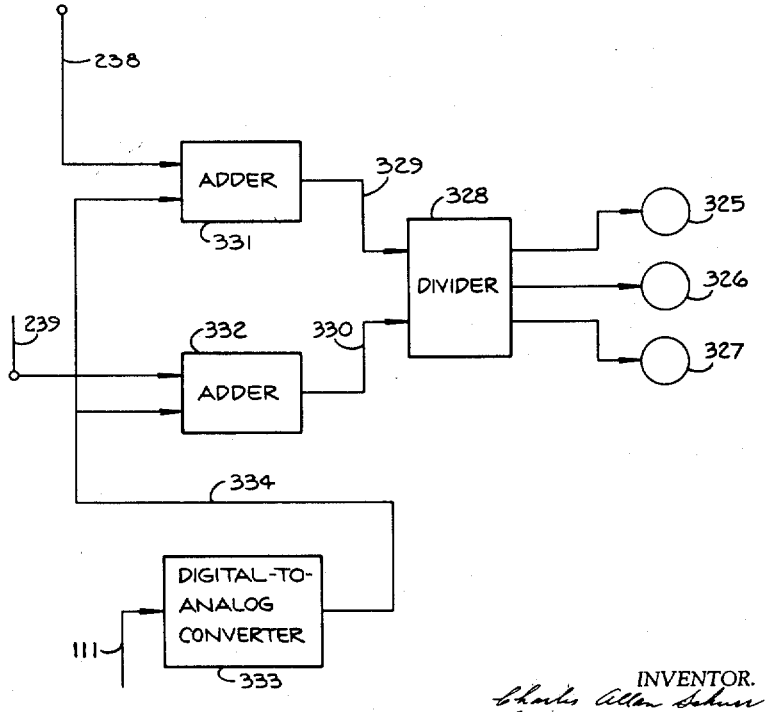
Figure 12:
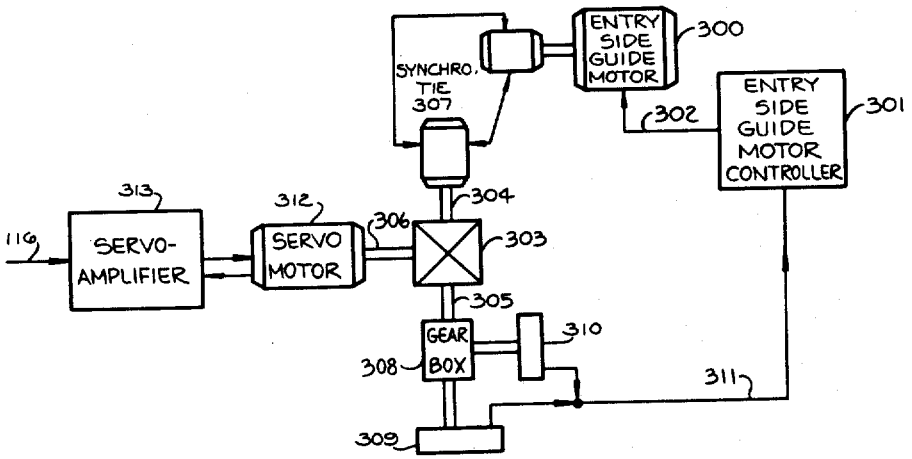
Figure 13A:
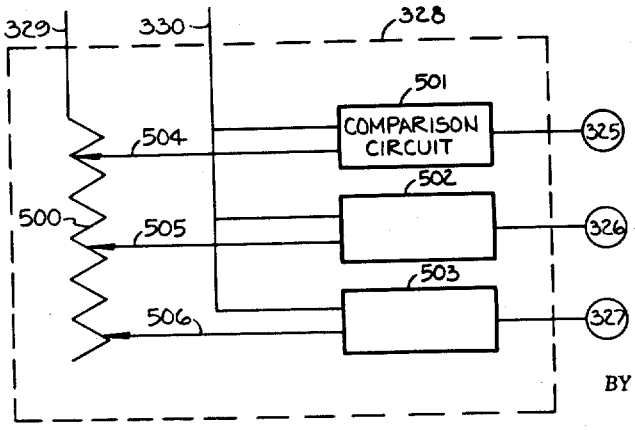
Figure 14:
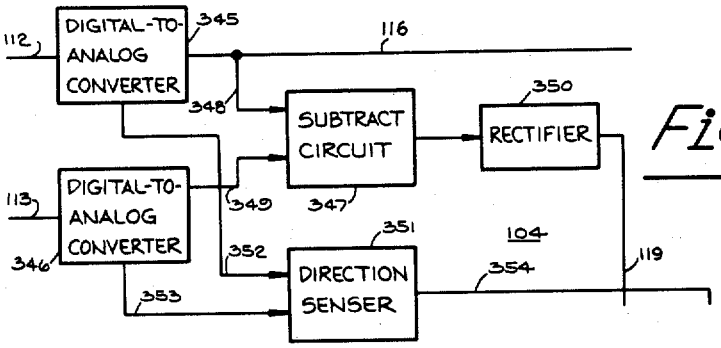
Figure 15:
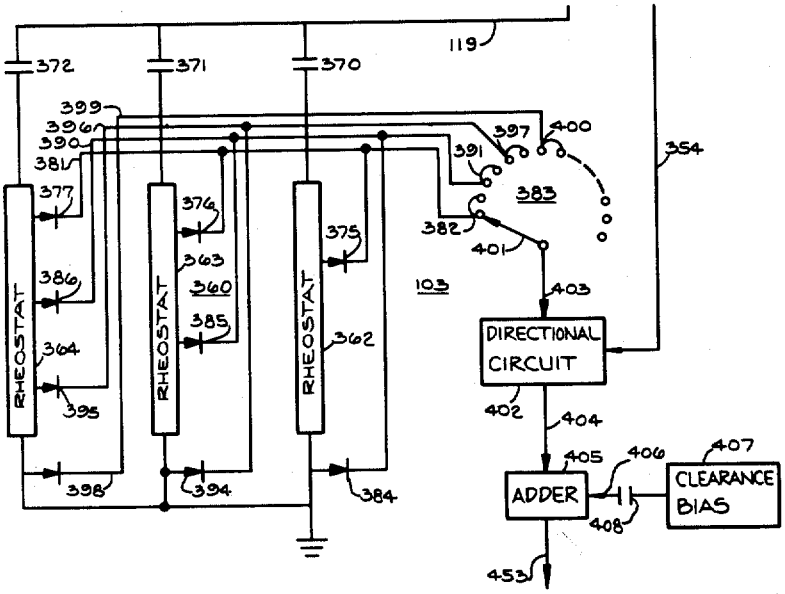
Figure 16:
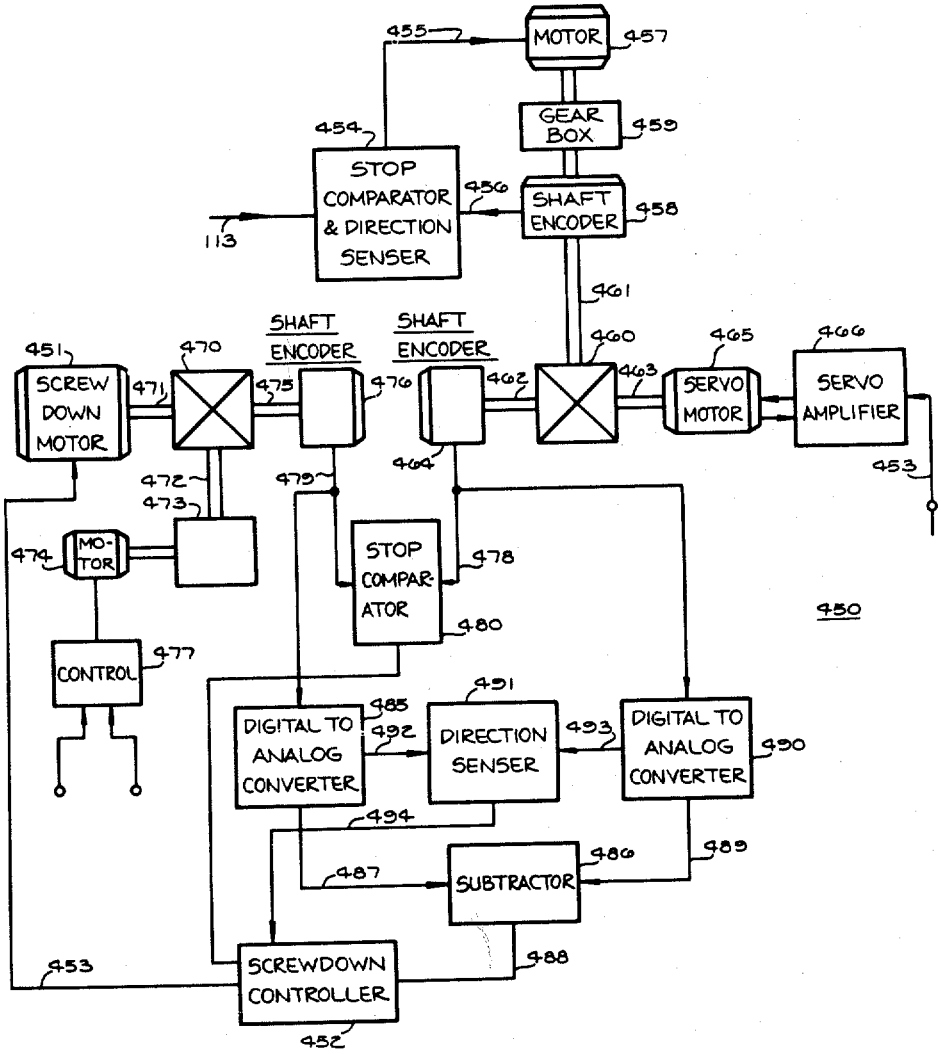

FIGURE 12 is a block diagram schematic illustrating the side guide positioner part of the control system of FIGURE 4;

FIGURE 13 is a block diagram schematic illustrating the draft compensation computer part of the control system of FIGURE 4, which establishes the speed ratios of the vertical and horizontal rolls;

FIGURE 13A is an expanded circuit diagram of a part of FIGURE 13;

FIGURE 14 is a block diagram schematic illustrating the vertical total draft computer part of the control system of FIGURE 4;

FIGURE 15 is a block diagram schematic illustrating the vertical rolling pattern computer part of the control system of FIGURE 4;

FIGURE 16 is a block diagram schematic illustrating the vertical screwdown position control unit part of the control system of FIGURE 4, which spaces the vertical rolls for certain passes.

An embodiment of the rolling mill control incorporating the features of the present invention is illustrated in the drawings for the purposes of exemplification and not for the purposes of limitation. Also, insofar as possible, schematic and block diagram type illustrations have been used to better point out the features of the present invention without detailing specific examples of components which are well known in the field.

Referring to the drawings, there is illustrated in the plan view of FIGURE 1 a rolling mill having an approach table 10, an entry table 11, and a delivery table 12 positioned to support a slab or workpiece 13 while it is being rolled by vertical rolls 14–14′ and horizontal rolls 15. The terms slab and workpiece as used herein are meant to include any item capable of being worked on by spaced rolls or other tools between which the item is moved. The approach table 10 is driven by *a* suitable approach drive 16, which usually includes a variable speed electric motor interconnected with the approach table 10 by *a* suitable driving mechanism illustrated by [the dash-dot] *a dash-dot line* 17. Similarly, the entry table 11 is driven by a suitable entry drive 18, which usually includes a variable speed electric motor interconnected with the entry table 11 by *a* suitable mechanism illustrated herein by [the dash-dot lines] *a dash-dot line* 19. Likewise the delivery table is driven by a delivery drive 20, usually including a variable speed electric motor mechanically interconnected with the delivery table 12 by *a* suitable mechanism represented herein by the dash-dot line 21.

The vertical rolls 14 and 14′ are driven by a variable speed vertical roll drive 22 and are spaced apart by a vertical screwdown drive 23, both of which are connected to the rolls by suitable mechanisms, illustrated herein by [the] respective dash-dot lines 24 and 25. In the present instance, the vertical rolls 14 and 14′ are illustrated and will be described as being on the entry table side of the main or horizontal rolls 15. It is understood however, that in some instances, the vertical rolls 14 and 14′ may be positioned on the delivery table side of the horizontal [roll] *rolls* 15, and that such positioning of the vertical rolls 14–14′ on the delivery side of the horizontal rolls 15 will necessitate certain minor changes in the herein described control system, but without departing from the invention as hereinafter claimed.

As also illustrated in FIGURE 1, the horizontal rolls 15 are driven by a suitable variable speed horizontal roll drive 26, as for example, variable speed electric motors, and are positioned or spaced apart by a horizontal screwdown drive 27. The horizontal roll drive 26 and the horizontal screwdown drive 27 are suitably and mechanically interconnected with the rolls 15 by suitable interconnection means, illustrated herein by [the] respective dash-dot lines 28 and 29. As also illustrated, the horizontal rolls 15 are rotatably supported by a mill housing 30 which must be sufficiently strong to withstand the forces exerted thereon by the rolls during the rolling operation. The details of construction of the housing 30 and various drives have not been illustrated herein, since these parts are commonly used in industry and are well known in the rolling mill industry.

The rolling mill also includes entry side guides 31 and 31′ and delivery side guides 32 and 32′ [,] which are positioned on opposite sides of the horizontal and vertical rolls 15 and 14 and above their respective entry and delivery tables 11 and 12. The entry side guides 31 and 31′ are moved towards and away from each other in directions transversely of the path of movement of a workpiece 13 through the horizontal and vertical rolls 15 and 14 by an entry side guide positioner 33, connected to the entry side guides 31 and 31′ by a suitable mechanism [,] represented herein by [the dash-dot lines] *a*

*dash-dot line* 34. Similarly, the delivery side guides are movable towards and away from each other in directions transversely of the path of movement of a workpiece 13 through the horizontal and vertical rolls *15 and 14* by a delivery side guide positioner 35, which is connected to the side guides 32 and 32' by a suitable mechanism[,] represented herein by [the] *a* dash-dot line 26. The side guide positioners 33 and 35 are operative to move the respective side guides 31–31' and 32–32' towards each other to position the workpiece in the middle of the respective table 11 or 12 just before it enters the rolls and to [line] *align* the workpiece lengthwise of the entry and delivery tables 11 and 12.

WORKPIECE CONDITIONS

For purposes of description, the workpiece 13 has a lead or leading end 37 and a tail or trailing end 38. The workpiece also has conditions representing various physical properties thereof. One of the conditions of the workpiece is the average original thickness condition, represented herein by the letter "$T_o$." Another condition is the average original width condition, represented herein by the letter "$E_o$." Another condition of the workpiece 13 is its original metallurgical condition, for example, as evidenced by hardness, represented herein by the letter "A." The original workpiece temperature condition is represented herein by the letter "G." Along with these conditions, the desired final product conditions including final width $E_f$, final thickness $T_f$, and product designation B, as explained below, must also be known before a rolling pattern can be determined for the workpiece. With this information, a rolling pattern for the workpiece 13 to be rolled is ascertained so that the desired final product will be produced by a rolling mill controlled by a control system incorporating the features of the present invention.

Figure 2:
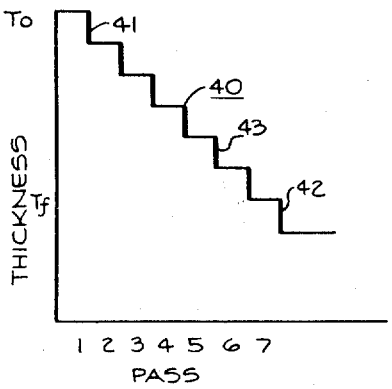
FIGURE 2 is a representative graph of a rolling pattern showing the reduction in thickness during each pass for a product which will be finished in a succeeding rolling operation.

The final product of a rolling mill such as the one described herein may be either rough strip, wherein its thickness or surface quality need not be within very close tolerances, or finish strip, wherein close tolerances in thickness and surface finish must be maintained. Before a proper rolling pattern may be ascertained for a workpiece, it is, of course, necessary to know which of the aforesaid two types of final product is desired. One factor to be considered in the determination of the correct rolling pattern for any workpiece is the final product desired, for example, one of the choices above. This factor is herein referred to as the product designation B. If the required final product is designated as rough strip, one of two possible product designations B, wherein its thickness or [surfaces] *surface finish* does not have to be within very exact tolerances, a rolling pattern 40 such as illustrated in FIGURE 2 is generally used. The rolling pattern 40 of FIGURE 2 shows the reduction in thickness from an original thickness $T_o$ to a final thickness $T_f$ for a multi-pass operation wherein the workpiece is passed through the rolls and reduced in thickness. The draft or reduction in thickness of the workpiece 13 during the first pass is represented by the portion 41, the reduction in thickness during the final pass is represented by the portion 42, and the reduction in thickness for one of the intermediate passes is represented by the portion 43. The thickness of the workpiece at the completion of a particular pass will be referred to herein by the letter "$T_n$" where n represents the numerical designation of the particular pass. It is noted that the draft, that is, the reduction in thickness during each pass is approximately equal to the draft for every other pass when rough final products are being rolled.

Figure 3:
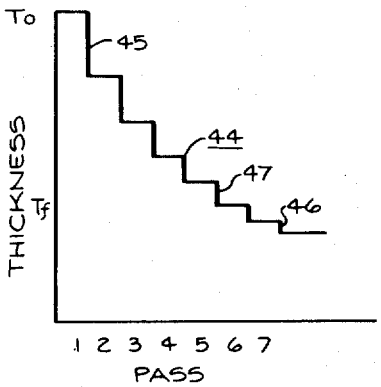
FIGURE 3 is a representative graph of a rolling pattern showing the reduction in thickness during each pass for a product which will not be further rolled.

On the other hand, if the final product is designated as finish strip, the other of two possible product designations B, wherein close tolerances in thickness and surface [finishes] *finish* are to be held, a rolling pattern 44 such as *that* illustrated in FIGURE 3 is usually used.

As may be seen from this figure, if it is desired to obtain the final thickness and accurate surface conditions within very close tolerances, the draft for one pass is different than the draft for another pass. The reduction in thickness during the first pass, represented by portion 45, is much greater than the reduction in thickness during the final pass, represented by the portion 46, so that the very fine finish tolerances can be obtained. The draft during one of the intermediate passes [are] *is* represented by [portions,] *a portion* such as portion 47.

Therefore, in the control system of the present invention, the determination of whether the final product is to be a finish strip or a rough strip, the product designation B, is in operative effect a designation of one of two possible broad rolling patterns.

CONTROL SYSTEM

The control system for the rolling mill of FIGURE 1 is illustrated in block diagram in FIGURE 4. In this control system, the sequence of operations of the rolling mill, including the approach table 10, entry table 11, delivery table 12, vertical rolls 14–14' horizontal rolls 15 and side guides 31–31' and 32–32' as well as the related drives, positioners and screwdowns, is controlled by a master programmer 50. The solid lines in FIGURE 4 represent particular signals and related signal carriers or conductors for transmitting that signal, and the arows on the solid lines represent the direction of signal flow. As illustrated, the master programmer 50 is connected by signal carriers 51, 52, 53 and 54 to position detectors PD1, PD2 and PD3 and a load detector LD1, respectively, which are mounted on or positioned in operative detection relationship with the rolling mill. The approach drive 16, entry drive 18, delivery drive 20, vertical roll drive 22 and horizontal roll drive 26 are directly controlled by respective controllers 57, 58, 59, 60 and 61, which are operated in accordance with signals or signal carriers 62, 63, 64, 65 and 66 interconnecting the respective controllers with the master programmer 50.

The control system also controls horizontal screwdown 27 by means of a horizontal screwdown controller 67, which is responsive to the signal in signal carrier 68 interconnecting horizontal roll digital control unit 69 with horizontal screwdown controller 67. Similarly, the vertical screwdown 23 is controlled by a vertical screwdown controller 70, which is responsive to the signal in a signal carrier 71 interconnecting a vertical roll digital control unit 72 with vertical screwdown controller 70. The horizontal roll digital control unit 69 and the vertical roll digital control unit 72 are responsive to the signals in respective signal carriers 73 and 74 interconnecting a screwdown program computer 75 with control units 69 and 72 respectively as well as the signals in respective signal carriers 76 and 77, interconnecting the master programmer 50 with the control units 69 and 72 respectively. The signals from the master programmer 50 and in signal carriers 76 and 77 cause the screwdowns to operate at the correct time during the sequence of operation of the mill and the signals from the screwdown program computer 75 and in the signal carriers [76 and 77] *73 and 74* cause the screw downs to space the respective rolls at the correct spacing or draft for each pass of the work piece 13 through the rolls 14 and 15. The horizontal roll digital control unit 69 is also responsive to the signal in a signal carrier 78 interconnecting a horizontal roll shaft encoder 79 and control unit 69 and to the signal in a signal carrier 80 interconnecting a horizontal calibration control 81 and the control unit 69. Similarly, the vertical roll digital control unit 72 is responsive to the signal in a signal carrier 82 interconnecting a [horizontal] *vertical* roll shaft encoder 83 with control unit 72 and to the signal in a signal carrier 84 interconnecting a vertical calibration control 85 with control unit 72.

As previously described, the mill operates in accordance with the conditions of the workpiece 13. Thus, the control system must be provided with signals, each representing its respective condition of the workpiece 13. For purposes of clarity, the signal and its carrier or transmitting means will be referred to herein with the same reference character as the condition per se. In FIGURE 4, the sources for all condition signals [is] *are* represented by a single dash line block, herein referred to as condition signal sources 86, which is electrically interconnected with computer 75 to provide condition signals to the screwdown program computer 75. The entry side guide positioners 33 and 35 are controlled by a side guide controller 87, which is responsive to the signal in a signal carrier 88 interconnecting condition signal sources 86 with side guide controller 87 as well as a signal in a signal carrier 89 interconnecting master programmer 50 with side guide controller 87. As will be more fully described later, signal carriers also connect the data translator and pyrometer portions of the condition signal sources 86 to screwdown program computer 75.

The inherent conditions such as thickness, temperature, metallurgy or resistance to rolling and other similar factors of workpiece 13 must be taken into consideration in determining the number of passes and the draft for each pass during the rolling operation. These various conditions are translated into electrical signals so that they may be combined or otherwise used by the control system. The condition signal sources 86 is the source of each of these condition signals and thus must include translators for converting condition information to electrical condition signals.

CONDITION SIGNAL SOURCES

The information representing the conditions of original thickness $T_o$, desired final thickness $T_f$, original width $E_o$, desired final width $E_f$, metallurgy A, desired final product designation B, and the temperature G of the workpiece 13 is converted into representative electrical signals by the data translator 90 portion of condition signal sources 86.

Figure 5:
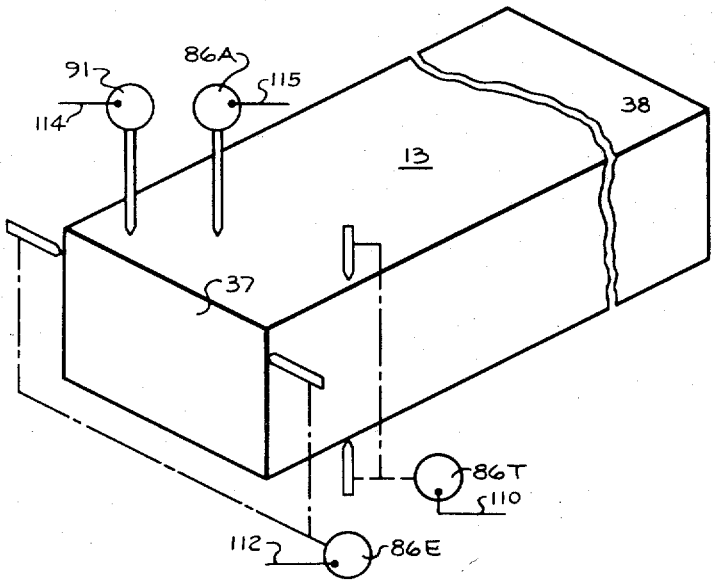
FIGURE 5 illustrates an alternate structure for providing workpiece condition signals used in the control system illustrated in FIGURE 4.

The conditions of original thickness $T_o$, original width $E_o$, and metallurgy A are preferably obtained directly from the workpiece 13 while it is on the approach or entry tables and immediately prior to the rolling operation, thus eliminating possibility of human error in setting controls, or in selecting punch cards for the billets. As illustrated in FIGURE 5, these measurements or conditions of the workpiece 13 are obtained by a plurality of translators 86E, 86T, and 86A, which provide electrical signals representing the original width, original thickness, and metallurgy, respectively. The electrical signals derived by the translators 86E, 86T and 86A may be considered as being portions of the data translator 90. As an alternative the data translator 90 may be a card and card reader or a punched or magnetic tape and tape reader, or other similar data translating means commonly used for the purpose of translating information to electrical signals. The data supplied on the card or tape reflects the existing condition of the billet, and the selection of the rolling program is not made by the operator but by the control system itself from the billet data. When such equipment is used, the card or tape must be fed into the data translator at the time the workpiece is to be rolled. The electrical signal representing the temperature condition G of the workpiece is easily established by a pyrometer 91. The metallurgy of the workpiece might be established by a bounce test or similar means to determine the hardness of the billet.

The structure and intricate mechanisms in the data translator and in the parts thereof are not described or illustrated in detail herein, since these details form no part of the present invention and since various designs of data translators are available for converting workpiece conditions into respective electrical signals.

The control system as illustrated in FIGURE 4 also includes a master control 92 electrically interconnected to the master programmer 50 by electrical connections 93 to control the starting and stopping of the control system. The master control 92 may be in the form of a push-button or other electrical device, which may be manually operated by a rolling mill operator to start the rolling mill or to stop it as desired.

MASTER PROGRAMMER

As previously described, the master programmer 50 provides signals which control the sequence of operation of the various parts of the rolling mill, including the horizontal and vertical roll drives, the horizontal and vertical screwdowns, the approach, entry and delivery tables, and the entry and delivery side guides. For purposes of exemplification and not of limitation, the sequence of operation for passing a workpiece 13 through the rolls three times is detailed in the chart of [FIGURE 6] *FIGURES 6 and 6A*.

Although the chart is for three pass operation, i.e., the workpiece is reduced in thickness in each of three successive passes of the workpiece through the rolls of the mill, it is understood that any number of passes may be used, dependent on the conditions and the rolling pattern established for a particular workpiece. In this particular chart, at least some of the conditions of the workpiece are recorded on a card for translation by a card reader type of data translator 90. Thus, in this instance when a workpiece 13 arrives on the approach table 10, a card containing data for that workpiece 13 provides at least some of the conditions for the data translator 90. At this time, all parts of the mill are off or de-energized and not operating.

Manual manipulation of the master control 92 initiates the operation of master programmer 50 to operate the mill in accordance with the sequence of operations and the control system illustrated in FIGURE 4. When the master control 92 is operated, it causes the master programmer 50 to send a signal by means of signal carrier 62 to the approach table controller 57, which ultimately starts the approach table 10 running at an approach speed forward to move the workpiece 13 in the direction of right to left in FIGURE 1. Following this, the data translator 90 and pyrometer 91 of signal sources 86 convert the workpiece conditions to electrical signals which are fed through signal carriers to the side guide controller 87 and screwdown program computer 75. As soon as the signals from the pyrometer 91 and the data translator 90 are made available by the condition signal sources 86, the screwdown program computer 75 responds to these signals and produces signals which are transmitted to the horizontal and vertical screwdown controllers 67 and 70, which control the screwdowns 27 and 23 of the horizontal and vertical rolls 15 and 14. Simultaneously, the master programmer signals the entry controller 58 to start the entry table moving at an approach speed forward, and also signals the side guide controller 87 to cause the side guides to operate to their odd pass position and move towards each other to position workpiece 13 in the middle of the entry table 11. When the leading end 37 of the workpiece 13 reaches the position detector PD3, a signal is transmitted by carrier 53 to the master programmer 50. The master programmer 50 responds to the signal in carrier 53 and causes the approach table controller 57 and entry table controller 58 to stop the forward movement of the approach table 10 and the entry table 11. The side guides 31 are operative to center the workpiece on the entry table 11 and the horizontal and vertical screwdowns are operative to position the horizontal and vertical rolls 15 and 14 at the correct spacing for the first draft or first reduction in the thickness of the workpiece from its original thickness $T_o$ to an intermediate thickness $T_n$. When the horizontal screwdown roll opening is within a preset distance from its programmed separation, the master programmer 50 signals the horizontal and vertical roll drive controllers 60 and 61 by means of respective signal carriers 65 and 66 and the entry table controller 58 by means of signal carrier 63, causing them to initiate forward movement of the rolls 15 and 14 and the entry table 11 at an entry speed. If the screwdowns have not already properly spaced the rolls, they complete their operation while the roll drives and entry table are running at entry speed forward. The entry table 11 continues to move the workpiece 13 towards the rolls 15 and 14 until the leading end 37 of workpiece 13 is in the rolls 15 thereby operating the detector LD1, which then sends a signal by signal carrier 54 to the master programmer 50. This signal causes the master programmer 50 to [in turn] signal, *in turn,* the horizontal and vertical roll drive controllers 61 and 60, the entry table controller 58 and the delivery table controller 59 to operate the respective rolls and tables at rolling speed forward.

The horizontal and vertical rolls 15 and 14, the entry table 11 and the delivery table 12 continue their rotation in the forward direction until the tail end 38 of workpiece 13 passes the position detector PD1, causing the position detector PD1 to signal by means of signal carrier 51 the master programmer 50 to that effect. At this time, the horizontal and vertical screwdowns 27 and 23, the approach table 10, and side guides [33 and 34] *31–31′* and *32–32′* are not moving. The horizontal and vertical roll drive controllers 60 and 61 now respond to the signals in carriers 65 and 66 from the master programmer 50 to cause the horizontal and vertical rolls 15 and 14 to run at an exit sped forward. Simultaneously, the entry table controller 58 responds to the signal in signal carrier 63 from master programmer 50 and causes the entry table 11 to stop running. Also, simultaneously the delivery table controller 59 responds to the signal in signal carrier 64 from the master programmer 50 and causes the delivery table drive 20 to operate the delivery table 12 at an exit speed forward to move the workpiece from the rolls and in a direction from right to left in FIGURE 1.

The workpiece is now arriving on the delivery table 12 from the first pass through the rolling mill. The first reduction in thickness or first draft causes the workpiece 13 to have a new thickness herein referred to as thickness $T_1$. When the workpiece 13 leaves the horizontal rolls 15, the detector LD1 responds to signal the master programmer 50 by means of signal carrier 54. The master programmer 50 in turn sends signals through signal carriers 65 and 66 to cause the horizontal and vertical roll drive controllers 60 and 61 to stop rotation of the horizontal and vertical rolls 15 and 14. At this time and as soon as the workpiece 13 has left the horizontal rolls 15, the horizontal and vertical roll digital control [unit] *units* 69 and 72 respond to the [signal] *signals* in signal carriers 73 and 74 from screwdown program computer 75 and the signals in signal carriers 76 and 77 from the master programmer 50 to establish the spacing of the rolls for the next draft or pass. The horizontal and vertical screwdown controllers 67 and 70 respond to the digital control units 69 and 72, respectively, to initiate movement of the horizontal and vertical screwdowns 27 and 23 to the correct roll spacing for the next pass or draft and as determined by the rolling pattern previously established by the screwdown program computer 75. At this time, the horizontal and vertical rolls, the entry table, and the approach table are not running, as is indicated by the term OFF in FIGURES 6 and 6A. However, the delivery table continues running at the exit speed forward while the screwdown starts to space the horizontal and vertical rolls for the next pass of the workpiece therethrough, or if the rolling operation is completed, to move the workpiece away from the rolls so that the mill may be readied for the next workpiece.

Referring again to FIGURES 6 and 6A which illustrate a sequence of operation for three passes of the workpiece, it is noted that when the horizontal screwdown reaches a position, a predetermined distance from its new spacing for the second draft or pass, the master programmer 50 signals the delivery table controller 59 to start rotation of the delivery table 12 in the reverse direction at an entry speed. Rotation of delivery table 12 in the reverse direction will move a workpiece thereon from left to right in FIGURE 1 and towards the horizontal rolls 15. Simultaneously, the horizontal roll drive receives a signal from the master programmer 50 to start rotation of the horizontal rolls 15 at an entry speed in the reverse direction so that the workpiece 13 may be sent through the rolls 15 and towards the entry table 11 and approach table 10 to again reduce the thickness of the workpiece. In this particular instance, the master programmer 50 signals the vertical roll drive controller 60 to keep the vertical roll drive off and also signals the vertical screwdown controller to move the vertical rolls back away from the workpiece 13 while the workpiece 13 is passing through the horizontal rolls for the second pass.

The operation as described in connection with the first pass is substantially repeated throughout the remaining passes until the workpiece 13 has been reduced to the desired final thickness.

SCREWDOWN COMPUTER

Thus far, in the description, the function of the screwdown computer 75 and its association with the master programmer 50 and other parts of the control system have been described. The screwdown program computer 75 and other components which have been designed specifically for the present control system will now be described in more detail.

As described, one of the first steps in the rolling mill operation is to determine a rolling pattern, including the number of passes required, to reduce the workpiece 13 from its original thickness $T_o$ to its desired final thickness $T_f$ and the draft for each pass. In the present control system, as illustrated in FIGURE 7, a number of passes computer 100 and a horizontal total draft computer 101 are provided. The screwdown program computer 75 also includes a horizontal rolling pattern computer 102, a vertical rolling pattern computer 103, a vertical total draft computer 104, and a draft compensation computer 105.

The horizontal draft computer 101 is electrically connected to the data translator 90 of signal sources 86 by the signal carriers 110 and 111 to receive condition signals representing the original $T_o$ and desired final $T_f$ thickness respectively of the workpiece 13. The vertical total draft computer 104 is electrically connected to the data translator 90 of signal sources 86 by signal carriers 112 and 113 to receive the condition signals representing the original $E_o$ and desired final $E_f$ width respectively of the workpiece 13. The number of passes computer 100 is connected to the pyrometer 91 of signal sources 86 by a signal carrier 114 to receive the temperature condition signal G and is also connected to the data translator 90 by a signal carrier 115 to receive the metallurgy A and final product B signals.

The vertical total draft computer 104 subtracts the signal in signal carrier [112] *113* from the signal in carrier [113] *112 and provides, in a signal carrier 119,* a resultant or combined signal [$(E_f-E_o)$] $E_o-E_f$ which represents the increase in width of the workpiece 13 or the difference between the original width and desired final width of the workpiece. Similarly, the horizontal total draft computer 101 subtracts the signal in carrier 111 from the signal in carrier 110 and provides a resultant signal ($T_o-T_f$) which represents the total reduction in thickness or the difference between the original thickness and the desired final thickness of the workpiece. *The vertical total draft computer 104 also provides, in a carrier 116, the original width signal $E_o$ in analog form.* The vertical total draft computer 104 and the horizontal total draft computer 101 are each electrically connected to the number of passes computer 100 by a signal carrier 116 and 117, respectively, to transmit the [respective] resultant or combined [signals] *signal* $(T_o-T_f)$ and [$E_f-E_o$] *the signal* $E_o$ to the number of passes computer 100. The number of passes computer 100 responds to all of these signals G, A and B, [$(E_f-E_o)$] $E_o$ and $(T_o-T_f)$ in signal carriers 114, 115, 116 and 117 respectively and determines the number of passes required to reduce the workpiece 13 from its original thickness $T_o$ to the desired final thickness $T_f$ without overloading the rolling mill or subjecting it to unnecessary or damaging stresses. Connected to the number of passes computer 100 is a signal carrier 118 which transmits from computer 100 a signal representing the determined number of passes or times the workpiece is to be reduced in thickness by the horizontal rolls 15. This signal carrier effects operation of the horizontal and *vertical* rolling pattern computers 102 and 103 as will later be described in more detail.

NUMBER OF PASSES COMPUTER

As illustrated in FIGURE 8, the number of passes computer 100 includes a plurality of signal responsive devices such as relay coils or devices 120, 121, and 122, each of which is designed to respond to its own individual signal as represented by lines 123, 124, and 125 respectively and not to respond to other signals. The electrical signal responsive devices 120, 121 and 122 are electrically connected through a pass determining circuit 126 and a suitable computing system including servo motors 127 and 128, servo amplifiers 129 and 130, potentiometers 131, 132 and 133, adder 134 and relay control 135. The potentiometer 131 is electrically connected by signal carrier 117 to the horizontal total draft computer 101 to receive the signal $T_o-T_f$, representing the difference between the original thickness and desired final thickness signals from the condition signal sources 86. Potentiometer 132 is electrically connected to the vertical total draft computer 104 by signal carrier 116 to receive the original width signal $E_o$ (in analog form) therefrom. Potentiometer 133 is electrically interconnected between the potentiometer 131 and the pass determining circuit 126 by signal carriers 136 and 137.

Signal carrier 137 is positioned along potentiometer 133 by servo motor 127. Servo motor 127 is responsive to the temperature signal G since it is connected by signal carrier 138 to servo amplifier 129 which receives its signal from pyrometer 91 by way of signal carrier 114. The signal carrier 136 is positioned along the potentiometer 131 by servo motor 128. Servo motor 128 is connected by signal carrier 139 to servo amplifier 130, which in turn is electrically connected to adder 134 by signal carrier 140.

Interconnecting the potentiometer 132 and the adder 134 is a signal carrier 141, which is positioned along potentiometer 132 by relay control 135. Adder 134 is also connected to relay control 135 by a signal carrier 142 and relay control 135 is electrically connected to the signal carrier 115 to receive the metallurgy and final product condition signals A and B from the condition signal sources 86.

Signal $E_o$ representing the original width of the workpiece is fed into the potentiometer 132 by signal carrier 116 and signals A and B are fed into the relay control 135 by signal carrier 115. The relay control 135 cooperates with potentiometer 132 by positioning carrier 141 therealong to combine the original width and final product signals $E_o$ and B into an analog signal $BE_o$ which is transmitted by the carrier 141 and also converts metallurgy signal A to analog form and directs signal A onto carrier 142. The adder 134 then adds this combined signal $BE_o$ on carrier 141 to the signal A on carrier 142 so that a resultant analog signal $(A+BE_o)$ appears on carrier 140. The servo amplifier 130 amplifies the signal $(A+BE_o)$ and carrier 139 transmits the amplified signal to the servo motor 128, thus causing the servo motor 128 to position carrier 136 along potentiometer 131 and in accordance with the signal $(A+BE_o)$ on carrier 139.

As previously described, the analog signal representing the difference in the original and final thickness $(T_o-T_f)$ is fed into potentiometer 131 by signal carrier 117. Servo motor 128 and potentiometer 131 effectively multiply the two signals, i.e. the signals $(A+BE_o)$ on carrier 139 and $(T_o-T_f)$ on carrier 117 so that the resultant analog signal $(A+BE_o)(T_o-T_f)$ appears on signal carrier 136 and thus at the potentiometer 133. Servo motor 127 cooperates with the potentiometer 133 to effect a combination of the signals $(A+BE_o)(T_o-T_f)$ on carrier 136 and the signal G on carrier 138 into a final signal $(A+BE_o)(T_o-T_f)$ G, which signal is then fed through carrier 137 to the pass determining circuit 126 which may be in the form of a voltage magnitude switching system capable of causing operation of the desired one of devices 120, 121, or 122. One example of such a device is a contact making voltmeter in which each set of contacts is open or closed, depending on the voltage impressed on the meter. Thus one of the signal responsive devices, for example relay coils 120, 121, or 122, operates or is energized in response to the magnitude of the output of the pass determining circuit 126.

It is to be noted that the workpiece conditions heretofore explained, including $T_o$, $T_f$, $E_o$, A, B and G, are represented by electrical signals. Consequently, their combination as recited in accordance with a formula for the determination of a discrete number of passes need not be dimensionally correct since the required unit conversion is inherent in the structure of the electrical apparatus described. A mathematically correct formula would include proper constants to make the equated quantities agreeable as to units and would appear as follows: $(AK_1+BE_o)(T_o-T_f)GK_2$=No. of passes, where $K_1$ and $K_2$ are constants required to render the equation dimensionally correct.

In the present complete control system, the energization or operation of the signal responsive devices 120, 121 and 122 affects the operation of the horizontal rolling pattern computer 102 in a manner which will later be described. It is apparent however, that the number of passes computer 100 operates in accordance with the invention and is herein described to provide a control system for determining the number of times or passes a workpiece is to be passed through the rolling mill to reduce the workpiece from an original thickness to a final thickness. The determined number of passes is derived from the conditions of the workpiece at the start of the rolling operation and the end product and final dimensions.

The original thickness, original width and metallurgy conditions may be alternatively measured directly from the workpiece by their respective signal source portions, diagrammatically illustrated as 86T, 86E, and 86A in FIGURE 5 of the signal sources 86.

The number of passes is automatically and quickly obtained from the workpiece while it is on the approach table or the entry table. Thus the problem of estimating the number of passes from the conditions of the workpiece is removed from the operator so that he may more effectively oversee other operations of the rolling mill. This also eliminates the possibility of overloading the mill housing or other parts of the mill.

HORIZONTAL TOTAL DRAFT COMPUTER

The horizontal total draft computer 101 illustrated in FIGURE 9 includes digital to analog converters 145 and 146 and an analog subtract circuit 147. The digital to analog converter 145 is electrically connected by the carrier 110 to the condition signal source 86 so that it will receive a digital signal $T_o$ therefrom, which represents the original thickness condition of the workpiece 13. The digital to analog converter 146 is connected by carrier 111 to the condition signal source 86 so that it will receive a digital signal $T_f$ therefrom representing the desired final thickness of the final product. The digital to analog converters 145 and 146 simply convert the digital type of signal to an analog type of signal so that the signals $T_o$ and $T_f$ may be subtracted by the subtract circuit 147, which is electrically connected to both digital to analog converters 145 and 146 by signal carriers 148 and 149 respectively. The subtract circuit 147 is electrically connected to the number of passes computer 100 and the horizontal rolling pattern computer 102 by signal carrier 117 and provides an analog type signal $(T_o-T_f)$ representing the difference between the original and desired final thickness of the workpiece 13.

HORIZONTAL ROLLING PATTERN COMPUTER

The horizontal rolling computer 102, as illustrated in FIGURE 10, has a rough strip final product bank 160 of voltage dividers or rheostats and a finish strip final product bank 161 of voltage dividers or rheostats. In the specific embodiment and for the purpose of exemplification and not of limitation, the rough strip final product bank 160 has a three pass voltage divider 162, a five pass voltage divider 163, and a seven pass voltage divider 164. Similarly, the finish strip final product bank 161 has a three pass voltage divider 165, five pass voltage divider 166 and a seven pass voltage divider 167.

Voltage divider rheostats 162, 163 and 164 are selectively connected to source 160' by electrical contacts 170, 171 and 172 respectively. Likewise, rheostats 165, 166 and 167 are selectively connected to source 161' by electrical contacts 173. 174 and 175. Sources 160' and 161' are selectively connected to supply 117 by electrical contacts 168 and 169. Contacts 168 and 169 are selectively operated by a final product signal from the data translator. Closing of the selected one of switches 168 or 169 determines which one of rheostat banks 160 or 161 will respond to the signal in carrier 117. If the contacts 168 are closed, condition signal $(T_o-T_f)$ representing the difference between the original thickness $T_o$ and the final thickness $T_f$ and appearing in carrier 117 energizes the selected one of the voltage dividers 162, 163 and 164, depending on which of these dividers is selected by the number of passes computer 100. The energization of a selected one of voltage dividers 162, 163, or 164 is controlled by inserting contacts 170, 171 and 172 in series in their respective leads 162', 163', and 164' and having those contacts 170, 171 and 172 operated by their respective signal responsive devices on relay coils 120, 121 and 122 of the number of passes computer 100. Similarly, contacts 173, 174 and 175 are connected in series in the leads 165', 166' and 167' respectively and are also operated along the contacts 170, 171 and 172 by the signal responsive devices 120, 121 and 122 respectively.

As illustrated, each voltage divider has electrical output taps which divide the voltage across the voltage divider. Each tap includes a blocking rectifier. The blocking rectifiers prevent circulation of the electrical output of any one tap through any other tap and also through any other voltage divider. Each tap and its respective blocking rectifier is identified in the drawing by a single reference character.

As an example, the voltage divider 164 of the rough strip final product bank 160 is divided into seven parts in accordance with the graph of FIGURE 2, and the voltage divider 167 of the finish strip final product bank 161 is divided into seven parts in accordance with the graph in FIGURE 3. Blocking rectifier taps 157, 176, 177, 178, 179 and 180 at the ends of the voltage dividers 162, 163, 164, 165, 166, and 167 respectively are connected together by a conductor 181 to a position 182 on a selector switch 183, or stepping relay controlled by master programmer 50. The first draft or pass taps 184, 185, 186, 187, 188, and 189 of the voltage dividers 162, 163, 164, 165, 166, and 167 respectively are connected together by conductor 190 to a position 191 on selector switch 183 and to a position 192 on a selector switch 193, or stepping relay controlled by master programmer 50. The second draft taps 194, 195, 196, 197, 198, and 199 of the voltage dividers 162, 163, 164, 165, 166 and 167 respectively are connected together by conductor 200 to a position 201 on selector switch 183 and a position 202 on selector switch 193. The third draft taps 203, 204, 205, 206, 207 and 208 of the voltage dividers 162, 163, 164, 165, 166 and 167 respectively are connected together by conductor 209 to a position 210 on selector switch 183 and a position 211 on selector switch 193. The fourth draft taps 212, 213, 214, and 215 of the voltage dividers 163, 164, 166 and 167 respectively are connected together by conductor 216 to a position 217 on selector switch 183 and a position 218 on selector switch 193. The fifth draft taps 219, 220, 221 and 222 of the voltage dividers 163, 164, 166 and 167 respectively are connected together by conductor 223 to a position 224 on selector switch 183 and a position 225 on selector switch 193. The sixth draft taps 226 and 227 of the voltage dividers 164 and 167 respectively are connected together by conductor 228 to a position 229 on selector switch 183 and to a position 230 on selector switch 193. The seventh draft taps 231 and 232 of the voltage dividers 164 and 167 respectively are connected together by conductor 233 to a position 234 on selector switch 183 and to a position 235 on selector switch 193. The selector switches 183 and 193 have contact arms 236 and 237 respectively which are movable from one position to another. These arms move as the program advances from one pass to the next. Contact arm 236 is connected to a signal carrier 238 and contact arm 237 is connected to a signal carrier 239.

HORIZONTAL SCREWDOWN DIGITAL CONTROL UNIT

The horizontal roll digital control unit 69, calibration controls 81, shaft encoder 79 and horizontal screwdown controller 67 of the control system of FIGURE 4 are combined into and form a horizontal screwdown digital control unit 250, illustrated in block diagram in FIGURE 7 and in further detail in FIGURE 11. The horizontal screwdown 27 in FIGURE 1 includes a screwdown motor 251 which is rotated in opposite directions as directed by a screwdown controller 252, which is electrically connected thereto by connection 253.

The screwdown position control unit 250 receives signal $T_f$ representing the desired final thickness of the workpiece from the condition signal source by means of a signal carrier 111 which interconnects control unit [252] *250* and signal source 86, and a draft or pass signal $(T_n-T_f)$ from the horizontal rolling pattern computer 102 by means of signal carrier 239 which interconnects control unit [252] *250* and computer 102. These signals from carriers 111 and 239 are coordinated with a feedback from the screwdown motor 251 to inform screwdown controller 252 how to control the screwdown motor 251 in a manner now to be described.

As illustrated in FIGURE 11, the digital final thickness signal $T_f$ is received from condition signal source 86 by signal carrier 111 electrically connected to a stop comparator and direction senser 254. Interconnected with direction senser 254 by means of connections 255 and 256 are a motor 257 and a shaft encoder 258 respectively. The motor 257 and the shaft encoder 258 are also interconnected mechanically by suitable means, for example, a gear box 259. The stop comparator and direction senser 254 causes the motor 257 to rotate towards a position as dictated by the signal $T_f$ received from the signal carrier 111, and the shaft encoder 258 causes the motor 257 to stop when it has reached that position. Also, mechanically interconnected with the shaft encoder 258 [,] *and* the motor 257 is a differential 260 having three shafts, namely, 261, 262 and 263. Shaft 261 is connected to the shaft encoder 258. Shaft 262 is connected to a shaft encoder 264, and the shaft 263 is connected to a servo motor 265 which responds to a digital signal $(T_n-T_f)$, received by means of signal carrier 239 from the draft pattern computer 102 and as amplified by a servo amplifier 266.

A second differential 270 is used in the screwdown position control unit 250 and has one of its shafts 271 connected to the screwdown motor 251, another shaft 272 interconnected through gear box 273 or suitable mechanical connection to a motor 274, and a third shaft 275 mechanically connected to a shaft encoder 276. The motor 274 may be manually controlled through a control 277 to change the relative position of the shafts 271, 272, and 275 of differential 270 and thus change the position of the shaft encoder 276 relative to the spacing of the horizontal rolls 15–15' and the screwdown motor 251 for purposes of calibrating the system.

The shaft encoders 264 and 276 are electrically connected by connections 278 and 279 respectively to a digital stop comparator 280 in such manner that the stop comparator 280 indicates when the spacing of horizontal rolls 15 as established in the shaft encoder 264 is the same as the true roll spacing as indicated by the shaft encoder 276.

Interconnected in series between the screwdown controller 252 and the shaft encoder 276 is a digital to analog converter 285 and a subtractor 286. This interconnection is made by connecting connector 279 to the digital to analog converter 285, and connecting a connector 287 between digital to analog converter 285 and subtractor 286, and connecting a connector 288 between subtractor 286 and screwdown controller 252. Subtractor 286 is also connected by a connector 289 to a digital to analog converter 290 which receives a signal from shaft encoder 264 by means of the connector 278. The control unit is completed by electrically interconnecting a direction senser 291 to the digital to analog converters 285 and 290 and the screwdown controller 252 by means of signal carriers 292, 293, and 294 respectively. The output of the stop comparator 280 is a signal which either energizes or deenergizes the screwdown controller 252 when the digital output of the shaft encoders 276 and 264 are in exact agreement or not respectively.

The digital to analog converters 285 and 290 produce outputs 292 and 293 respectively, which are supplied to the direction senser 291. Direction senser 291 compares these signals and produces an output of one sense or another on carrier 294. This signal on carrier 294 is supplied to the screwdown controller 252 and is used to cause its output to be in such a sense as to cause the screwdown motor to operate in a direction which will reduce the numerical difference between the indications of shaft encoders 276 and 264 to zero.

Digital to analog converters 285 and 290 also produce analog signals on carriers 287 and 289 which are proportional to the numerical signals on carriers 279 and 278 from shaft encoders 276 and 264 respectively. These signals on carriers 287 and 289 are subtracted in subtractor 286 and the resultant analog signal output on carrier 288 is supplied to the screwdown controller 252. This signal is used to control the speed of the screwdown motor 251 as it operates to reduce the difference between the numerical indications of shaft encoders 276 and 264 to zero.

In summary, the operation of the horizontal screwdown digital control unit 250 shown in FIGURE 11 is as follows. A digital signal proportional to $T_f$ is introduced on carrier 111 whereupon it is converted to an analog signal on shaft 261. An analog signal proportional to $T_n—T_f$, which is derived from the horizontal rolling pattern computer 102, is introduced on carrier 239 whereupon it is converted to an analog signal on shaft 263. The signals on shafts 261 and 263 are added together mechanically in differential 260 so as to produce an analog signal proportional to $T_n$ at shaft 262. The analog signal at shaft 262 is converted to a digital signal in shaft encoder 264.

The position of the rolls is converted to a digital signal by shaft encoder 276.

The control equipment then operates upon the screwdown controller 252 so that the numerical difference between the indications of shaft encoders 276 and 264 is reduced to zero when the roll spacing will correspond to the command signal $T_n$.

SIDE GUIDE POSITIONER

The side guide positioner of the control system of FIGURE 4 is illustrated in FIGURE 12 in further detail. Since the controls for the entry side guide *positioner* 33 and the delivery side guide *positioner* [34] *35* may be identical, only the control for the entry side guide *positioner* 33 will be described. The entry side guide *positioner* 33 includes an entry side guide motor 300 operated directly under the control of an entry side guide motor controller 301, connected thereto by conductor means 302. The controller 301 causes the motor 300 to operate in forward or reverse direction to move the entry side guides 31 towards and away from each other. The side guide positioner includes a differential 303 provided with three shafts, namely, 304, 305, and 306. Shaft 304 is coupled through synchronous tie motors 307 to the entry side guide motor 300. Shaft 305 is mechanically connected through a suitable gear box 308 to a coarse cam switch 309 and a vernier cam switch 310, which are electrically interconnected by means of conductor 311 with the entry side guide motor controller 301, shaft 306 is interconnected with a servo motor 312 which responds to the analog signal $E_o$ representing the original certain widths of the workpiece, this signal being received from the vertical total draft computer 104 by means of signal carrier 116 and amplified by a servo amplifier 313.

Shaft 306 is positioned angularly in accordance with the analog signal $E_o$ on carrier 116 and this shaft position will be maintained while rolling on any one program. The coarse and vernier cam switches 309 and 310 respectively cooperatively control the entry side guide motor 300 through the entry side guide motor controller 301 to cause the motor to stop with the side guides positioned in one of two selected positions. One of these positions will correspond to the original width of the workpiece 13 and the other will be greater than this amount by a fixed clearance. The particular position chosen will be controlled by the master programmer 50 of FIGURE 4. The synchronous tie motors 307 provide a feedback of the angular position of the entry side guide motor shaft.

DRAFT COMPENSATION COMPUTER

It is necessary to provide automatic adjustment of the relative speeds of the horizontal and vertical roll drive motors in accordance with the percentage draft taken on those passes where the workpiece is between both the horizontal and the vertical rolls simultaneously. This is because the linear surface speed of that portion of the workpiece 13 on the entry side of the horizontal rolls 15–15' is different than the linear surface speed of that portion of the workpiece 13 on the delivery side of the horizontal rolls 15–15' and it has been found that the relative rotational speeds of the horizontal and vertical rolls vary in accordance with the percentage of draft or the reduction in thickness in the horizontal rolls during a particular pass. The relative speeds of the horizontal and vertical roll drive motors may be automatically established by the draft compensation computer 105 as illustrated in FIGURES 7 and 13. This computer comprises a plurality of draft compensation relays such as relays 325, 326 and 327 energized electrically from a divider 328 which receives its electrical signals by means of signal carriers 329 and 330 from adders 331 and 332 respectively. Adder 331 is electrically connected to signal carrier 238 and thus to the horizontal pattern computer 102 and to a digital to analog converter 333 by means of a signal carrier 334. Digital to analog converter 333 is connected to signal carrier 111 and thus to the condition signal source 86 to receive the digital final thickness $T_f$ signal of the workpiece 13. The digital to analog converter 333 converts the digital signal $T_f$, representing the final thickness of the workpiece to an analog voltage signal $T_f$, representing the final thickness of the workpiece. The adder 332 is electrically interconnetced with the horizontal rolling pattern computer 102 by means of signal carrier 239 and also by means of signal carrier 334 to the digital to analog converter 333.

The analog signal on carrier 238 is a voltage proportional to $T_{n-1}-T_f$ where $T_{n-1}$ is the thickness of the workpiece 13 on the pass ahead of the nth pass and $T_f$ as before is the final thickness at the end of the rolling program. Adder 331 functions to add the analog signals on carriers 238 and 334 to produce an analog signal at its output on carrier 329 proportional to $T_{n-1}$. The analog signal on carrier 239 is a voltage proportional to $T_n-T_f$ where $T_n$ is the thickness of the workpiece 13 on the nth pass. Adder 332 functions to add the analog signals on carriers 239 and 334 to produce an analog signal at its output on carrier 330 proportional to $T_n$. Divider 328 functions to operate one of the draft compensation relays in accordance with the quotient $T_{n-1}/T_n$. The load circuits of these relays are operatively connected to the horizontal roll drive controller 61 and the vertical roll drive controller 60 by connections not shown. These relays function to control the relative speeds of the horizontal roll drive 26 and the vertical roll drive 22 in accordance with the draft taken on each pass as indicated by the quotient $T_{n-1}/T_n$.

The divider 328 is further illustrated in FIGURE 13A as including a voltage divider 500 and several comparison circuits such as for example circuits 501, 502, and 503. The comparison circuits each have two input terminals and each controls an output relay which is either energized or de-energized in accordance with the polarity of the potential difference between the two inputs. One end of resistor 500 is attached to signal carrier 329 and the comparison circuits 501, 502 and 503 are connected by carriers or wires 504, 505 and 506 respectively to various points along resistor 500. In this way the potential at one input to each comparison circuit is a fixed fraction of the potential representing the signal on carrier 329. The signal on carrier 330 is connected to the other input terminal on each of the comparison circuits 501, 502 and 503. The comparison circuits compare the signal on carrier 330 with various fractions of the signal on carrier 329 and consequently the contacts of relays 325, 326 and 327 may be used to provide electrical signals defining in what range of magnitude the fraction $T_n/T_{n-1}$ falls where $T_n$ is the signal on carrier 330 and $T_{n-1}$ is the signal on carrier 329.

VERTICAL TOTAL DRAFT COMPUTER

The vertical total draft computer 104, as illustrated in FIGURE 14, includes digital to analog converters 345 and 346 and an analog subtract circuit 347. The digital to analog converter 345 is electrically connected by carrier 112 to the condition signal source 86 so that it will receive a digital signal $E_o$, therefrom which represents the original width condition of the workpiece 13. The digital to analog converter 346 is connected by carrier 113 to the condition signal source 86 so that it will receive a digital signal $E_f$ therefrom representing the desired final width of the finished product. The digital to analog converters 345 and 346 simply convert a digital type of signal to an analog type of signal so that the signals $E_o$ and $E_f$ may be subtracted by the subtract circuit 347, which is electrically connected to both digital to analog converters 345 and 346 by signal carriers 348 and 349 respectively. As illustrated, the subtract circuit 347 provides an analog voltage proportional to $E_o-E_f$ representing the difference between the original and final widths of the workpiece 13. This signal is electrically connected through a suitable rectifier 350 to the vertical rolling pattern computer 103 by *the* signal carrier [116] *119*. Thus the signal $E_o-E_f$, representing the difference between the original and final width of the workpiece is an analog voltage form on carrier [116] *119*.

The workpiece 13 may have a final width either greater or less than the initial width. The signal on carrier [116] *119* is an analog voltage of constant polarity. Direction senser 351 compares the signals on carriers 352 and 353 and produces a signal on carrier 354 for operation of a relay circuit in accordance with the relative size of these signals. The total draft signal on carrier [116] *119* and the directional signal on carrier 354 are supplied to the vertical rolling pattern computer 103.

Generally, the workpiece 13 has an initial or original width $E_o$ which is less than the final width $E_f$ of the finished product. Thus, during an initial pass of the workpiece between the rolls 14 and 15, the rolls 14–14′ should be closer together than during a final pass and the vertical screwdown 23 must be controlled to insure this. The correct positioning of the vertical rolls 14 and 14′ is accomplished by providing the direction senser 351, which cooperates with the rectifier and other parts of the circuit. The direction senser is connected by carriers 352 and 353 to the digital analog converters 345 and 346 respectively so that it will receive signals therefrom representing the original and final width signals $E_o$ and $E_f$. The output of the direction senser 351 appears on a signal carrier 354 electrically connected thereto.

VERTICAL ROLLING PATTERN COMPUTER

The vertical rolling pattern computer 103 as illustrated in FIGURE 15 has a bank of voltage dividers 360 including any desired number of voltage dividers. In the specific embodiment and for the purpose of exemplification and not of limitation, the bank 360 has a three pass voltage divider 362, a five pass voltage divider 363 and a seven pass voltage divider 364. The voltage dividers 362, 363 and 364 are connected selectively by closure of contacts 370, 371 and 372 to the signal carrier [116] *119* extending from the vertical total draft computer 104. Thus condition signal ($E_o-E_f$), representing the difference between the original width $E_o$ and the final width $E_f$ and which appears in carrier [116] *119*, energizes the selected one of the voltage dividers 362, 363 or 364, depending on which of these dividers is selected by closure of contacts 370, 371 or 372 by signal responsive devices 120, 121 or 122 of the number of passes computer 100.

As illustrated, each voltage divider has output taps which divide the voltage across the voltage divider and each tap includes a blocking rectifier. The blocking rectifiers prevent circulation of the output of any one tap through any other tap and also through any other voltage divider so that the resultant signal is the exact signal for determining the draft during that particular pass to which the selector switch is positioned. The taps 375, 376 and 377 of the voltage dividers 362, 363 and 364 respectively are connected together by conductor 381 to a position 382 on a selector switch 383 or stepping relay controlled by the master programmer. The taps 384, 385 and 386 of the voltage dividers 362, 363 and 364, respectively, are connected together by conductor 390 to a position 391 on selector switch 383. The taps 394 and 395 of the voltage dividers 363 and 364 respectively are connected together by conductor 396 to a position 397 on selector switch 383. The tap 398 of the voltage divider 364 is connected by conductor 399 to a position 400 on selector switch 383. The selector switch 383 has a contact arm 401 which is movable from one position to another. Contact arm 401 is connected to a directional circuit 402 by a signal carrier 403.

The directional circuit 402 is also connected to the signal carrier 354 to receive the directional signal from the direction senser 351. The directional circuit responds to the signals on carriers 354 and 403 to provide an analog voltage signal in an output signal carrier 404, which onnected to an adder 405. As further illustrated in FIG-JRE 15, this adder also receives a clearance bias signal y means of a carrier 406 from a clearance bias circuit 07. The adder adds these two signals together to pro-ide a control signal which is fed by means of the carrier 53 to the servo amplifier 466 in FIGURE 16. It has een found desirable to have the vertical rolls engage the 'orkpiece for only odd passes. The clearance bias cir-ıit is operative to withdraw the vertical rolls from the 'orkpiece during the alternate passes in which it is not eeded. During the passes when the vertical rolls are to ıgage the workpiece, the bias control is disconnected by ıitable switch means 408, thus causing the adder to pass signal representing the roll opening indicated by the ıeostat taps. Operation of the rheostat circuits is sub-antially the same as for that of the horizontal rolling attern computer already described.

VERTICAL SCREWDOWN

The vertical roll digital control unit 72, calibration con-ols 85, shaft encoder 83 and vertical screwdown con-oller 70 of the control system of FIGURE 4 are com-ned into and form a vertical screwdown digital control ıit 450, illustrated in block diagram in FIGURE 7 and further detail in FIGURE 16. The vertical screw-ɔwn 23 in FIGURE 1 includes a screwdown motor 451 hich is rotated in opposite directions as directed by a rewdown controller 452, which is electrically connected ereto by connection 453. The screwdown position con-ol unit 450 receives signal $E_f$ representing the final width the workpiece from the condition signal source 86 by eans of signal carrier 113 and a draft or pass signal $E_n-E_f$) from the vertical rolling pattern computer 103 means of signal carrier 453. These signals from car-ers 113 and 453 are co-ordinated with a feedback from e screwdown motor 451 to inform screwdown controller 2 how to control the screwdown motor 451 in this way. As illustrated in FIGURE 16, the final width signal $E_f$ received from condition signal source 86 by signal car-r 113, electrically connected to a stop comparator and rection senser 454. Interconnected with direction senser 4 by means of connections 455 and 456 are a motor 457 d a shaft encoder 458 respectively. The motor 457 and e shaft encoder 458 are also interconnected mechanically suitable means 459, such as [for example] a gear box. ıe stop comparator and direction senser 454 causes the ɔtor 457 to rotate towards a position as dictated by the ;nal $E_f$ received from the signal carrier 113 and the aft encoder 458 causes the motor 457 to stop when it s reached that position. Also, mechanically interconcted with the shaft encoder 458 and motor 457 is a ferential 460 having three shafts, namely 461, 462 and 3. Shaft 461 is connected to the shaft encoder 458. aft 462 is connected to a shaft encoder 464, and the aft 463 is connected to a servo motor 465 which re-ɔnds to a signal ($E_n-E_f$) received by means of signal rier 453 from the pattern computer and as amplified a servo amplifier 466.

A second differential 470 is used in the screwdown sition control unit, and has one of its shafts 471 con-cted to the screwdown motor 451, another shaft 472 in-connected through gear box 473, or other suitable chanical connection to a motor 474, and a third shaft 5 mechanically connected to a shaft encoder 476. The ɔtor 474 may be manually controlled through a control 7 to change the relative position of the shafts 471, 2 and 475 of differential 470 and thus change the posi-n of the shaft encoder 476 relative to the spacing of vertical rolls 14–14′ and the screwdown motor 451. The shaft encoders 464 and 476 are electrically con-cted by connections 478 and 479 respectively to a stop nparator 480 in such manner that the stop comparator ) indicates when the spacing of rolls 14–14′ as estab-ıed in the shaft encoder 464 is the same as the true roll cing, as indicated by the shaft encoder 476.

nterconnected in series between the screwdown controller 452 and the shaft encoder 476 is a digital to analog converter 485 and a subtractor 486. This interconnection is made by connecting connector 479 to the converter 485, and connecting a connector 487 between converter 485 and subtractor 486 and connecting a connector 488 between subtractor 486 and screwdown controller 452. Subtractor 486 is also connected by a connector 489 to a digital to analog converter 490 which receives a signal from shaft encoder 464 by means of the connector 478. The control unit is completed by electrically interconnecting a direction senser 491 to the digital to analog [converter] *converters* 485 and 490 and the screwdown controller 452 by means of signal carriers 492, 493 and 494 respectively. Operation of this portion of the control is substantially the same as that of the horizontal screwdown digital control unit so that further description is unnecessary.

OPERATION

The operation of the various components and parts of the invention have been described along with the description of those parts. Insofar as the operator of the mill is concerned, all he has to do is push the button on the master control 92 when a workpiece 13 has been received on the approach table 10. The master programmer 50 is then energized to completely coordinate the operation of the screwdowns, entry and delivery tables, side guides, roll drives, and devices for determining the number of passes and the draft for each pass as well as the condition signal sources. The condition signal sources respond to the conditions of the workpiece 13 to provide the condition signals as previously described and the master programmer assures that the operation of the mill proceeds in a sequence as set forth in the description relating to FIGURES 6 and 6A.

It is thus apparent that the present invention has provided structure and the method of automating and controlling a rolling mill to increase its efficiency and to reduce possible damage of the mill through misadjustment by the operator. The control system herein described has thus attained the objects and the goals set forth and has solved many of the problems and overcome the deficiencies of the prior control systems.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

We claim:

1. A control system for a rolling mill having a screwdown control and comprising: a device for determining the number of passes a slab is to be passed between the rolls to reduce the slab from an original thickness to a final thickness, said device including condition signal source means providing condition signals representing the actual conditions of a slab to be rolled and including original ($T_o$) and final ($T_f$) slab thickness, original ($E_o$) and final ($E_f$) slab width, slab metallurgy (A), final product (B) desired, and slab temperature (G), means receiving said condition signals and combining them, in accordance with the formula $$(AK_1+BE_o)(T_o-T_f)K_2G=\text{No. of passes}$$

wherein $K_1$ and $K_2$ are dimensional constants, respectively, into a combined signal representing the total number of passes for that particular slab, a plurality of pass signal producing means, a plurality of individual signal responsive devices, each representing a different number of passes and each responsive only to its respective combined signal to electrically connect its respective pass signal producing means to said condition signal source means, each signal producing means having output means providing a group of pass signals including an original thickness pass signal and a final thickness pass signal and intermediate pass signals, and circuit means adapted for successively transmitting the pass signals from the output means of a selected signal producing means to a screwdown control so that the control can be made to respond successively to those individual pass signals.

2. A control system for a rolling mill having a screwdown control and comprising a device for computing the number of passes a slab is to be passed between the rolls to reduce the slab from an original thickness to a final thickness, said device including a plurality of individual signal responsive devices, each representing a different number of passes and each responsive only to its respective electrical signal, a plurality of condition signal sources, each source providing a condition signal representing its respective condition of a slab to be rolled and including original ($T_o$) and final ($T_f$) slab thickness, original ($E_o$) and final ($E_f$) slab width, slab metallurgy (A), final product desired (B) and slab temperature (G), and means receiving said signals and combining them in accordance with the formula $(AK_1+BE_o)(T_o-T_f)K_2G$=No. of passes, wherein $K_1$ and $K_2$ are dimensional constants, respectively, into a combined signal representing the number of passes for that particular slab, a plurality of pass signal producing means electrically connected to those of said condition signal sources providing condition signals representing the original and final slab thickness, each pass signal producing means being controlled by its respective one of said signal responsive devices, and means transmitting said combined signal to said signal responsive devices to cause that one of said devices which is responsive to the said combined signal to respond thereto and effect energization of its respective pass signal producing means, each pass signal producing means upon energization producing a group of pass signals including an original thickness pass signal and a final thickness pass signal and intermediate pass signals, each of said signal producing means having output terminals establishing the individual pass signals in that group of pass signals, and circuit means adapted for successively connecting the individual output terminals of a selected signal producing means to a screwdown control so that the control can be made to respond successively to the individual signals emitted therefrom.

3. A control system for a rolling mill having a screwdown control and comprising a device for computing the number of passes a slab is to be passed between the rolls to reduce the slab from an original thickness to a final thickness, said device including a plurality of individual signal responsive devices, each representing a different number of passes and each responsive only to its respective electrical signal, a plurality of condition signal sources, each source providing a condition signal representing its respective actual condition of a slab to be rolled and including original ($T_o$) and final ($T_f$) slab thickness, original ($E_o$) and final ($E_f$) slab width, slab metallurgy (A), final product desired (B) and slab temperature (G), and means receiving said signals and combining them into a combined signal representing the number of passes for that particular slab, said means combining said signals in accordance with the formula $$(AK_1+BE_o)(T_o-T_f)GK_2=\text{No. of passes}$$

wherein $K_1$ and $K_2$ are dimensional constants, respectively, a plurality of voltage dividers constituting pass signal producing means electrically connected to those of said condition signal sources providing condition signals representing the original and final slab thickness, each pass signal producing means being controlled by its respective of said signal responsive devices, and means transmitting said combined signal to said signal responsive d vices to cause that one of said devices which is responsi to the said combined signal to respond thereto and effe energization of its respective pass signal producing mean each pass signal producing means upon energizatic producing a group of pass signals including an orig nal thickness pass signal and a final thickness pass sign and intermediate pass signals, each of said signal produ ing means having output terminals establishing the i dividual pass signals in that group of pass signals, at lea one of said signal producing means having output term nals providing a different total number of individual pa signals than another of said signal producing means, a circuit means adapted for successively connecting t individual output terminals of a selected signal producin means to a screwdown control so that the control can made to respond successively to the individual signa emitted therefrom, said circuit means having rectifie one in series with each output terminal, and preventi the signal from a terminal of one signal producing mea entering another signal producing means.

4. A control system for a rolling mill in which redu tion operations are performed on a workpiece and co prising a plurality of groups of voltage dividers, select means operable for selecting a particular one of sa groups of voltage dividers, condition responsive mea responsive to the temperature of said workpiece and to least two other conditions of the workpiece to select one said voltage dividers in said particular group, means produce a first electrical signal across said selected one said voltage dividers, said electrical signal having a mag tude dependent upon the total reduction to be perform on the workpiece, each voltage divider having a predet mined number of spaced taps thereon of which the sp ing determines predetermined voltage increments, resp tively, of said first electrical signal, switch means coop able with said taps for selecting which of said predet mined voltage increments are to be used for a reducti operation, additional means for producing a second el trical signal dependent upon the preselected final thi ness of the product to be rolled, converter means operal for combining those of said predetermined voltage inc ments, selected by the switch means, with said seco electrical signal to produce a reference signal, and scr down controller means responsive to said reference sign

References Cited by the Examiner

The following references, cited by the Examiner, of record in the patented file of this patent or the origi patent.

UNITED STATES PATENTS

| | | | |
|---|---|---|---|
| 1,994,290 | 3/25 | Shover | 80— |
| 2,360,995 | 10/44 | Whitten | 80—5 |
| 2,476,839 | 7/49 | Cook | 80—5 |
| 2,706,422 | 4/55 | Lockwood | 80— |
| 2,875,390 | 2/59 | Tripp | 318— |
| 2,882,476 | 4/59 | Wetzel | 318— |
| 2,887,638 | 5/59 | Cail et al. | 318— |
| 2,900,241 | 10/59 | Bangert | 235— |

OTHER REFERENCES

Control Engineering, September 1956; pages 116 117.

Control Engineering, March 1957; pages 22 to 25.

Electronics, Engineering Edition, March 14, 1958; p 170.

Westinghouse Engineer, March 1957; pages 40 and

WILLIAM J. STEPHENSON, *Primary Examiner.*